Feb. 8, 1927.

J. PAOLICELLI ET AL 1,616,544

BURN-IN KNIFE

Filed Nov. 13, 1924

WITNESSES:

INVENTORS
Joseph Paolicelli
Eustace V. Paolicelli
BY

ATTORNEYS.

Patented Feb. 8, 1927.

1,616,544

UNITED STATES PATENT OFFICE.

JOSEPH PAOLICELLI AND EUSTACE V. PAOLICELLI, OF NEW YORK, N. Y.

BURN-IN KNIFE.

Application filed November 13, 1924. Serial No. 749,727.

This invention relates to an improved burn-in-knife and has for an object to provide a construction wherein the operating end of the knife is always maintained heated. Another object of the invention is to provide a burn-in-knife wherein the operating end is electrically heated, the same being so associated with a handle as to permit a cool handle and a hot knife.

In the accompanying drawing—

In finishing furniture, it is found that depressions or scratches are often found. In order to fill up and thereby eliminate these scratches, depressions and the like, a filling material of the desired kind is applied to these depressions or scratches by a heated knife. Heretofore, a knife having a curved end has been used, the same being heated over a burner or some other form of heater and then applied for melting the filling material in place. This necessitated the continuous use of the heater or burner near the workmen and also necessitated a certain amount of idleness while the knife was being heated. In order to overcome these objections and to present an improved structure, the burn-in-knife shown in the accompanying drawing has been produced.

Figure 1:
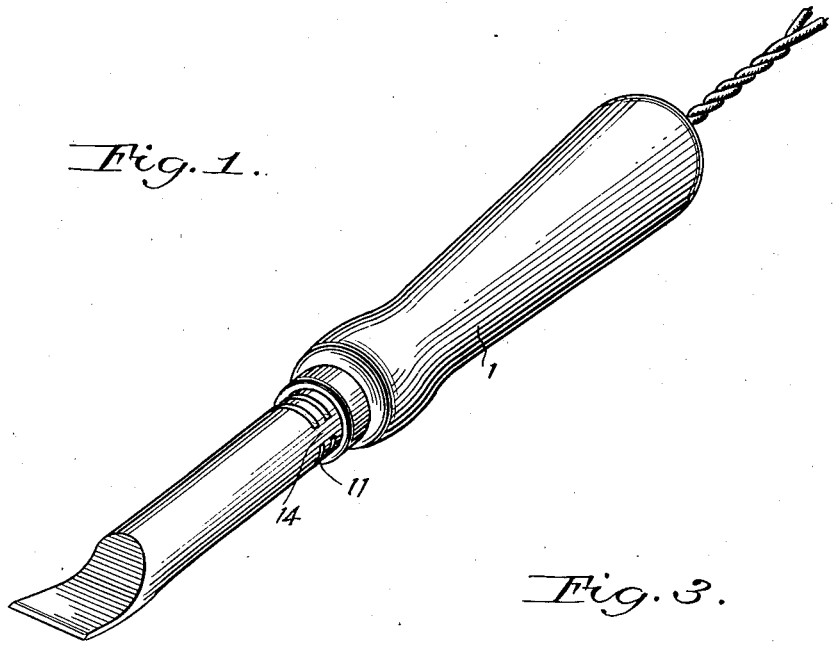
Figure 1 is a perspective view of a burn-in-knife disclosing an embodiment of the invention.
Figure 3:
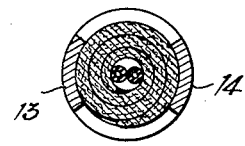
Figure 3 is a transverse sectional view through Figure 2, approximately on line 3—3, the same being on an enlarged scale.
Figure 2:
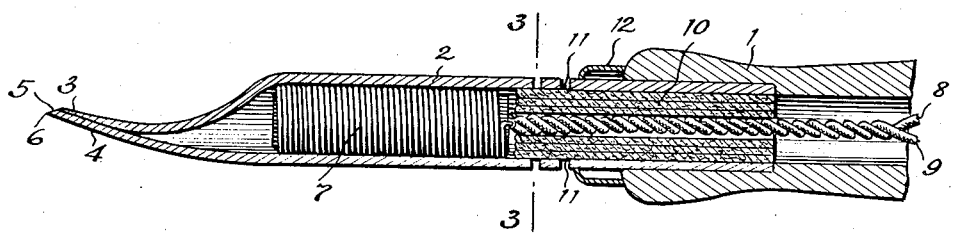
Figure 2 is a longitudinal vertical sectional view through a burn-in-knife disclosing an embodiment of the invention.

Referring to the accompanying drawing by numerals, 1 indicates a handle which may be of wood or other desired material, said handle receiving one end of the tubular body 2 of the knife, the opposite end being flattened and squeezed together as shown in Figure 2 so as to present a thin flat end 3 having a curved operating face 4. Preferably the end 3 is chamfered at 5 for presenting a sharp edge 6 which is adapted to act as a heated surface for causing the filling material to fill in the rough edge around the depression and then any excess to be spread or smoothed out.

As indicated in Figure 2, the body 2 is tubular or hollow and is provided with an electric heating unit 7 of any approved kind which is connected with a source of current through the wires 8 and 9. An asbestos filling 10 is provided at the end of the body 2 which extends into the handle 1 for insulating in a certain sense some of the heat from the handle 1. In order to assist insulating the handle 1 from body 2, a number of slots 11 are provided in the top and bottom of the body 2 near the ferrule so that the heat can travel through only small sections 13 and 14 of the solid metal.

When the device is to be used, the current is turned on and after the body 2 has been heated, it may be touched by a quantity of solid varnish or other filling material. This will result in a small quantity of the material being deposited on the end 3, which small quantity is then applied to the depression or scratch and the surface 4 rubbed over a supply which has been deposited in the depression. To finish off the surface of the filling material which has been deposited in the depression, the edge 6 is drawn over the same and if there is surplus material it will be forced off. It is understood that this action will not be sufficiently strong to scratch or injure the varnish or other coating on the furniture but will merely heat, remove and smooth the excess burn-in-shellac or filling material which has been deposited in the depression. After the various scratches, depressions and the like have been thus treated, the article of furniture may then be finished in any desired manner.

During the use of the burn-in-knife shown in the accompanying drawing, the same is continually maintained heated so that there is no loss of time waiting for the knife to be heated and also no danger of an open flame setting fire to any of the material near the workmen.

What we claim is:

A burn-in-knife comprising a tubular body, a handle of heat insulating material fitting over one end of said body, the other end of said body being flattened and curved to provide a filler applying surface, an electrical heating element within the body, said body having a plurality of transverse slots therein, adjacent the handle to interrupt the flow of heat by conduction through the handle.

JOSEPH PAOLICELLI.
EUSTACE V. PAOLICELLI.